United States Patent Office

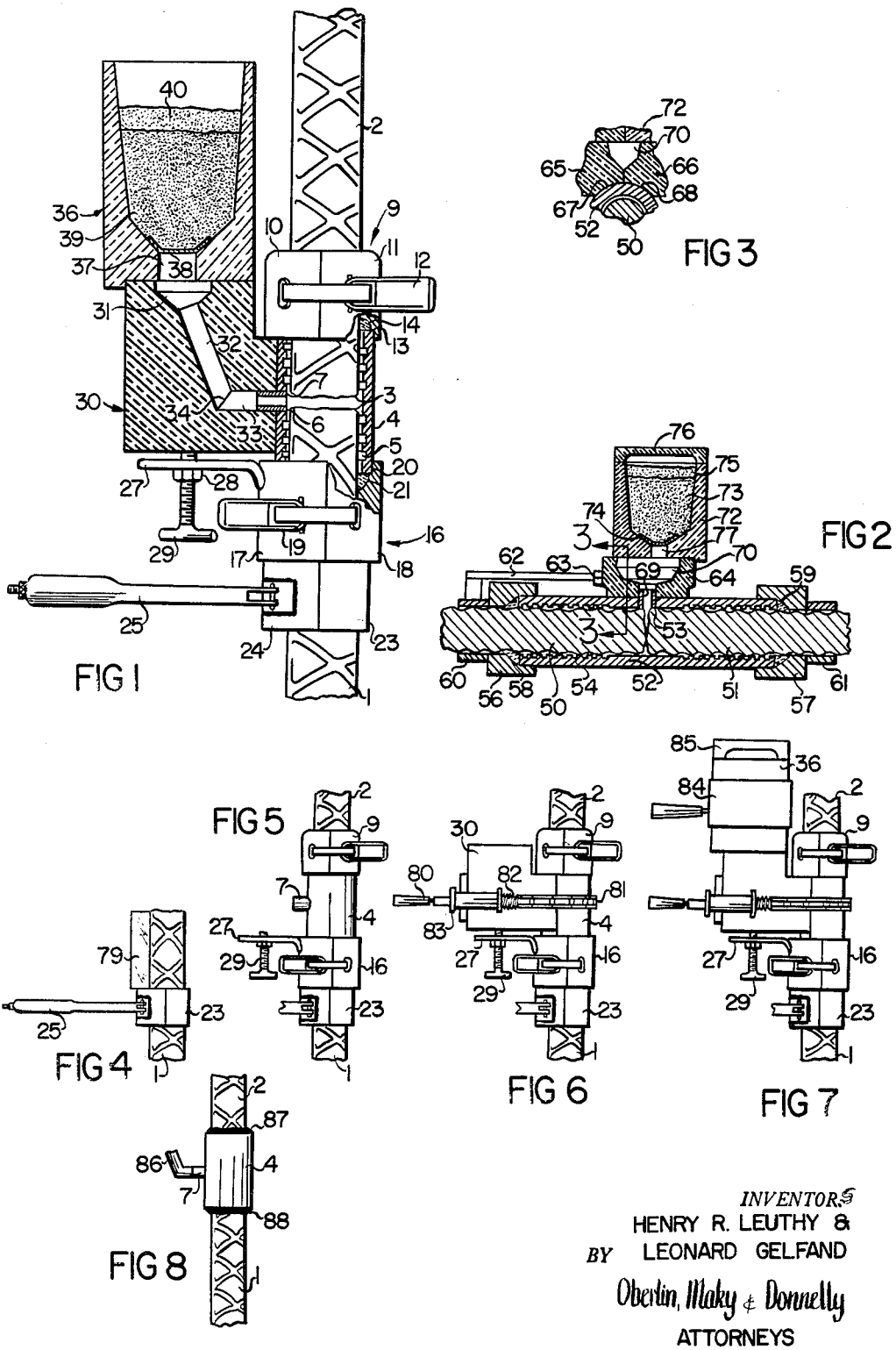

3,255,498
Patented June 14, 1966

3,255,498
APPARATUS FOR BUTT JOINING STEEL BARS AND THE LIKE
Henry R. Leuthy, Cleveland, and Leonard Gelfand, South Euclid, Ohio, assignors to Erico Products, Inc., Cleveland, Ohio, a corporation of Ohio
Filed Apr. 12, 1962, Ser. No. 187,115
10 Claims. (Cl. 22—58)

This invention relates generally, as indicated, to apparatus for butt joining steel bars and the like and more particularly to a method and apparatus for joining large steel bars of the type employed as reinforcing bars in concrete construction. This application is a continuation-in-part of our copending application, entitled "Butt Joining of Steel Bars and the Like," Serial No. 113,527, filed May 29, 1961.

Sleeve joints have been employed for heavy column reinforcement in which the stress will always be compressive, but in such joints only the ends of the sleeve are peripherally welded to the joined bars and such bars have to be specially ordered with sawed ends. Moreover, the deformations in such reinforcing bars makes it difficult properly to weld the sleeve to the bar.

In such aforementioned copending application, there is disclosed apparatus for butt joining of steel bars wherein a sleeve insert is employed within a mold cavity in a graphite mold with such sleeve surrounding the ends of the butt joined bars. However, for extremely large bars, such as #14S or #18S, it has been found that such apparatus requires relatively large unwieldy graphite block molds which are difficult to assemble and operate in field procedures.

It is accordingly a principal object of the present invention to provide apparatus for butt joining large steel bars and the like which can quickly and conveniently be employed in construction site procedures.

It is a further important object to provide apparatus for butt joining steel bars which requires no special end preparation of such bars and which will provide a bar joint having a strength equal to the design requirements of the bars.

It is another object to provide apparatus for butt joining steel bars and the like wherein the strength of the particular joint is not dependent upon the skill of the man performing the joining procedures in the field.

A still further object is the provision of apparatus for butt joining large steel bars and the like wherein no preheating or controlled cooling is required when splicing alloy or high carbon reinforcing bars.

It is a still further object to provide apparatus for butt joining steel bars and the like requiring relatively few easy to assemble parts enabling high speed field splicing procedures.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

FIG. 1 is a side elevation partially broken away and in section of apparatus in accordance with the present invention for butt joining relatively large column reinforcing bars and the like;

FIG. 2 is a longitudinal section of apparatus in accordance with the present invention for joining horizontally extending steel reinforcing bars and the like;

FIG. 3 is a fragmentary vertical section taken substantially on the line 3—3 of FIG. 2; and FIGS. 4 through 8 are side elevations on a slightly reduced scale of the various parts of the apparatus shown in FIG. 1 as they are assembled to form a butt joint in accordance with the present invention, FIG. 8 being the produced joint.

Referring now to the annexed drawing and more particularly to the embodiment of the invention illustrated in FIG. 1, there is shown vertically extending aligned reinforcing bars 1 and 2 which may, for example, be joined by the apparatus of the present invention to form reinforcing bars for structural columns in reinforced concrete buildings. In such column construction, relatively large bars such as a #14S or #18S will be employed having a diameter as large as 2¼ inches. As shown, the bars are deformed having rolled thereon surface lugs or deformations better to provide anchorage in the concrete that will surround the bars in the finished column structure. The ends of the bars are generally severed with a guillotine-type shear which produces a relatively rough end for such bars as shown at 3. The top bar 2 is temporarily externally supported and aligned with the bottom bar 1 and held such that the shear cut ends 3 are slightly spaced to provide a gap as shown of approximately ⅛ to ¼ of an inch. A sleeve 4 of an inside diameter slightly larger than the outside diameter of the bars is positioned about the spaced ends of the column bars and such sleeve is provided with a plurality of internal square cut grooves as shown at 5. A center sprue or tap hole 6 is provided with an insert guide tube 7 of copper or like material projecting horizontally from the sleeve 4. A top alignment fitting 9 provided with hinged halves 10 and 11 and a toggle clamp 12 encloses the upper end of the sleeve 4 against the annular shoulder 13 thus provided properly centering the upper end of the sleeve with respect to the upper bar 2. Suitable packing material 14 is employed to seal off the gap between the top end of the sleeve and the reinforcing bar 2, such packing material being, for example, asbestos, refractory fibrous material such as Cerrafelt or fibrous graphite.

A bottom alignment fitting 16 similarly comprised of semi-circular hinged halves 17 and 18 connected by toggle clamp 19 is employed to enclose and center the bottom of the sleeve 4 with respect to the lower bar 1. The sleeve is received in the annular top shoulder 20 in the bottom alignment fitting and a packing material 21 will also be employed to seal off the gap between the lower end of the sleeve and the reinforcing bar 1.

A support clamp 23 having a pair of gripping jaws 24 operated by a toggle linkage shown generally at 25 may be employed clamped to the bottom bar 1 properly to support the bottom alignment fitting 16. The bottom alignment fitting is provided with a bracket 27 extending horizontally from the alignment half 17. Such bracket is provided with an aperture and an internally capped nut 28 accommodating an adjusting support screw 29 extending upwardly therethrough. The support screw is employed to support a graphite pouring basin 30 which is preferably comprised of separable pouring basin halves supported on a toggle operated pouring basin frame. Such graphite pouring basin includes a top enlarged aperture 31 having a downwardly extending passageway 32 joining horizontal passageway 33 in a sharp elbow bend 34. The horizontal passageway is of a diameter only very slightly larger than the diameter of the guide tube 7 and fits closely thereover as shown. In this manner, the pouring basin 30 will be properly located with respect to the sleeve 4 and will be properly horizontally supported by the adjusting screw 29 on the bottom alignment fitting 16.

Mounted on top of the pouring basin 30, there is provided a graphite crucible 36 also preferably comprised of separable graphite halves supported on a conventional crucible frame operated by the usual toggle mechanism. Such crucible is provided with a bottom tap hole communicating with the enlarged chamber 31 in the pouring basin 30 and a disc 38 supports a charge of thermit welding powder or the like 39 topped with a starting powder 40. Such thermit welding powder may preferably be of the type shown in Cadwell Patent No. 2,229,045, such being an exothermic reaction mix which when ignited will produce a molten metal melting the disc 38 to permit the metal to flow through the pouring basin, the guide tube 7 and into the space within the sleeve 4 between the ends of the spaced reinforcing bars 1 and 2. As the molten metal flows into the space between the sleeve and reinforcing bars, it will fill the annular grooves 5 and also interengage with the deformations on such reinforcing bars. In this manner, a butt joint is provided where the molten metal interengages irregularities in the inner surface of the coupling member and the external surface of the rods.

The molten metal flowing through the passages 32 and 33 must traverse the sharp elbow bend 34 to enter the interior of the sleeve and this sharp elbow bend precludes high velocity direct impingement of the molten metal against the reinforcing bar or against the internal surface of the coupling sleeve 4. Such indirect metal flow has been found desirable to slow the momentum of the molten metal to preclude such direct impingement so that the molten metal will not eat away the bar or the internal wall of the sleeve as it strikes the same.

In this vertical set-up as described, it is desirable to have an adjustable support for the pouring basin shown in the form of adjusting screw 29, since the sleeve position will vary slightly with the thickness of the lower packing 21. In this manner, the pouring basin can firmly be supported regardless of such slight variations in the position of the sleeve 4 with respect to the bottom alignment fitting.

It can now be seen that the apparatus required to form a column butt joint comprises relatively few easy to assemble parts. If desired, the bottom alignment fitting 16 may incorporate therein the features of the bottom clamp 23 so that the bottom alignment clamp then not only aligns and supports the bottom of the sleeve 4, but additionally supports the entire mechanism. In this manner, the bottom alignment clamp can combine the function of both the alignment fitting and the support clamp and the support clamp shown as a separate element can then be omitted.

Referring now to FIG. 2, there is shown a sectional view of apparatus for forming a horizontally extending butt joint which comprises horizontally extending reinforcing bars 50 and 51 having their ends slightly spaced in the center of sleeve 52, beneath the central aperture 53 therein. The inside diameter of the sleeve 52 is provided with square cut threads or the like 54 which in the present embodiment are substantial in number due to the relatively longer length of the sleeve 52. Since in certain joints the full yield strength of the bar in tension may be required, a longer sleeve is employed having more square cut grooves or threads therein. In the FIG. 1 embodiment, the column joint shown may be required to carry the compression load only. End alignment fittings 56 and 57 surround the ends of the sleeve 52 with such ends being received in the enlarged beveled shoulders in such alignment fittings and suitable packing material may be employed to seal the ends of the sleeve against the rebar as shown at 58 and 59 respectively. Packing clamps 60 and 61 may be employed firmly gripping the respective bars 50 and 51 on the outboard side of the alignment fittings 56 and 57. The support frame 62 having a slide lock 63 may be provided extending from the packing clamp 60 to the graphite pouring basin 64 positioned on top of the sleeve 52. The pouring basin may preferably be comprised of two halves or mating graphite blocks 65 and 66 held together by a suitable pouring basin frame, not shown, and such halves may be provided with bottom curved portions 67 and 68 as shown in FIG. 3 better to seat the pouring basin on the curved top surface of the sleeve 52. A guide tube 69 of relatively short length is inserted within the tap hole 53 in the sleeve 52 and projects up into the passageway leading to the chamber 70 in the pouring basin. A crucible 72 is situated on top of the pouring basin and is provided with a charge of welding powder 73 supported on a thin steel disc 74 and an igniting charge is placed on top of the powder as shown at 75 and a suitable cover 76 may be employed on top of the crucible to deflect any heat or blast emanating therefrom during the ignition of the charge. When the starting powder 75 is ignited, the charge 73 will produce a molten metal which will melt the steel disc 74 causing the molten metal to flow into the chamber 70 in the pouring basin 64. The passageway 77 leading from the crucible into the chamber 70 is slightly vertically offset from the tap hole or guide tube 69 leading into the sleeve 52. In this manner, there will be no direct impingement of the downwardly flowing molten metal against the ends of the reinforcing bars 50 or 51 or against the inside of the sleeve 52 opposite the guide tube 69. A circuitous path is thus afforded the molten metal flow thereof to prevent it from impinging with a high velocity against any of the parts of the butt joint to produce an erosion while unduly heating the bars.

The packing material employed may be, as aforesaid, layers of asbestos, graphite, carbon, or alumina-silica ceramic batting which surrounds the irregular exterior surface of the reinforcing bars providing a seal between the bar and the sleeve ends preventing the escape of the metal from the interior thereof. Reference may be had to the copending application of Leonard Galfand, entitled "Cast Welding Apparatus," Serial No. 104,295, now abandoned, filed April 20, 1961 for a disclosure of ceramic or refractory battings which may be employed as seals with the present invention.

It will be understood that the graphite pouring basin, crucible and cover are made of separable mating graphite blocks supported on frames having toggle levers facilitating the separation thereof after their employment in the casting procedures. Such pouring basin and crucible may be employed over and over again for as many as, for example, 50 splices and reference may be had to U.S. Patent No. 2,870,499 issued to D. J. Burke and assigned to Erico Products, Inc. of Cleveland, Ohio for a disclosure of a frame and toggle clamp that may be employed with the pouring basin or crucible of the present invention.

A typical column splicing procedure is illustrated in FIGS. 4 through 8 and beginning with FIG. 4, it will be seen that the bottom support clamp 23 is positioned in place on the bottom reinforcing bar 1 with the aid of a gauge 79 measuring the distance from the top of the reinforcing bar 1 to the top of the support clamp 23.

Referring now to FIG. 5, the bottom alignment fitting 16 may then be placed on top of the projecting reinforcing bar above the bottom clamp 23 and, of course, packed with the aforementioned packing material. The sleeve 4 is then seated in the bottom alignment fitting and the top reinforcing bar is positioned in place. The sleeve may be positioned by telescoping the same over the top bar and as the top bar is aligned with the bottom bar, the sleeve 4 may then be slid downwardly properly to be seated in the bottom alignment fitting. The top alignment fitting is then placed on the top of the sleeve 4 and suitable packing will be employed therewith. The final procedure at this phase of the assembly is the insertion of the guide tube 7 in the tap hole of the sleeve 4.

Referring now to FIG. 6, the pouring basin 30 is positioned with the passageway 33 on the projecting guide tube 7 and the adjusting screw 29 is properly positioned with respect to the bracket 27 properly horizontally to support the pouring basin. As shown, toggle operating levers 80 for the frame of the pouring basin, shown greatly foreshortened for convenience of illustration, are employed to hold the halves of the pouring basin together. Additionally, a bicycle sprocket-type chain clamp may be employed extending from one side of the pouring basin to the other about the back of the sleeve 4. Such chain 81 may be adjustably fastened at the opposite side of the pouring basin and extends around the sleeve 4 to be secured to an adjusting screw 82 which can be turned by a wing nut or the like 83. In this manner, the pouring basin will be firmly held against the sleeve 4 and properly horizontally supported by the adjusting screw 29. The crucible 36 is then placed on top of the pouring basin as shown in FIG. 7 with the separate halves thereof held together by toggle operated frame 84, the operating handles of which are again shown greatly foreshortened for convenience of illustration. A cover 85 may then be positioned on top of the crucible after it has been properly charged as shown in FIG. 1 and when the charge is ignited, the molten metal will melt the disc 38 dropping into the pouring basin to move into the cavity about the elbow bend which is formed between the sleeve 4 and the closely spaced ends of the reinforcing bars 1 and 2. As seen in FIG. 8, the equipment may be readily removed simply by reversing the above procedure, for example, and a riser 86 will be left extending from the tap hole in the sleeve 4. The guide tube 7 will have coalesced with the molten metal so that it will now be indistinguishable from the riser and can readily be severed from the sleeve 4 with such riser.

Inspection of the joint to determine a proper splice is a simple visual matter. If the molten metal is visible at the top 87 and the bottom 88 after the apparatus has been removed as well as extending from the tap hole, the splice has been properly made. This ensures that the entire annular inner space between the sleeve and the closely spaced ends of the reinforcing bars is full of the molten metal which then forms a mechanical bond between the corrugations on the exterior of the bars and the square cut grooves on the interior of the sleeve. Accordingly, the reason for spacing the ends is not to weld the bars together, but to ensure that the filler metal flows in between and completely fills such space better to support such bars in compression. Under severe compressive loads, the filler material cannot be squeezed outwardly because it is contained by the strong sleeve surrounding it. Since the filler material does not actually weld the bars, it is then possible to employ extremely high carbon bars which are relatively inexpensive.

With the above-procedure, the ends of the reinforcing bars must be dry and clean as well as free of rust, dirt, grease, etc. However, mill scale does not have to be removed from the bars since there will preferably be no bonding as by a weld or solder type joint. Also, it is not necessary to preheat the bars or sleeve. Thus, both the bars and coupling sleeves are not subjected to a deleterious welding heat.

It will be understood that other types of internal deformations may be employed on the coupling sleeves and reference may be had to our aforementioned copending application, Serial No. 113,527 for a disclosure of further types of coupling sleeves that may be employed with the present invention.

The cross sectional area of the coupling sleeves may be determined approximately from the following mathematical formula:

$$A_{sleeve} = \frac{A_{bar} \times S_{bar}}{S_{sleeve}} (+ \text{area lost by tap hole})$$

A is area (in squares inches)
S is tensile stress (in pounds per square inch)

There are many different exothermic metal producing compositions which will produce strong splices in steel reinforcing bars. One such mixture that has been found to produce good quality joints in high carbon steels is the following:

| | Percentage by weight |
|---|---|
| Copper oxide (scale) | 73.9 |
| Copper aluminum alloy (50/50) | 17.6 |
| Tin (metal powder) | 3.9 |
| Calcium fluorspar | 2.3 |
| Calcium silicon | 2.3 |
| | 100.0 |

Other thermit mixes that have been found suitable for the joining of reinforcing bars are:

| | Percentage by weight |
|---|---|
| Copper oxide (scale) | 65.5 |
| Aluminum (atomized powder) | 13.1 |
| Iron oxide ($Fe_3O_4$, mill scale) | 17.1 |
| Calcium fluorspar | 2.1 |
| Calcium silicon | 2.2 |
| | 100.0 |

| | |
|---|---|
| Copper oxide (scale) | 74.0 |
| Aluminum (atomized powder) | 11.7 |
| Iron oxide ($Fe_3O_4$, mill scale) | 9.6 |
| Calcium fluorspar | 2.3 |
| Calcium silicon | 2.4 |
| | 100.0 |

| | |
|---|---|
| Copper oxide (scale) | 73.2 |
| Copper aluminum alloy (50/50) | 17.4 |
| Iron (metal powder) | 4.8 |
| Calcium fluorspar | 2.3 |
| Calcium silicon | 2.3 |
| | 100.0 |

| | |
|---|---|
| Copper oxide (scale) | 71.2 |
| Copper aluminum alloy (50/50) | 19.8 |
| Iron oxide ($Fe_3O_4$, mill scale) | 4.6 |
| Calcium fluorspar | 2.2 |
| Calcium silicon | 2.2 |
| | 100.0 |

| | |
|---|---|
| Iron oxide ($Fe_3O_4$, mill scale) | 73.5 |
| Aluminum (atomized powder) | 22.8 |
| Calcium fluorspar | 1.8 |
| Calcium silicon | 1.9 |
| | 100.0 |

It is noted that some of the aforementioned mixes may employ low grade mill scale since the electrical properties of the filler metal are of no great importance in the joining of steel reinforcing bars.

It can now be seen that there is disclosed apparatus for producing with simple and efficient field procedures butt joints for large size steel reinforcing bars which will produce firm joints in such bars with the overall joint being relatively narrow and of good appearance as viewed more particularly in FIG. 8.

Other modes of applying the principle of the invention may be employed, change being made as regards the details described, provided the features stated in any of the following claims or the equivalent of such be employed.

We, therefore, particularly point out and distinctly claim as our invention:

1. Casting apparatus for butt splicing upper and lower reinforcing bars in column construction comprising a strong non-removable sleeve-like mold adapted to become an integral part of the final splice, clamping means to hold opposed ends of such reinforcing bars within said mold with the latter providing an annular mold chamber defining space around the ends of the bars, means to seal at least the lower end portion of said sleeve-like mold against such lower bar, a tap hole in said sleeve, means to support a pouring basin and crucible against said tap hole for introduction of molten metal into said sleeve-like mold, and an insert guide tube fitted in and projecting laterally from said tap hole, said pouring basin being separably mounted on said guide tube and closely fitting thereover to introduce molten metal laterally therethrough into said sleeve-like mold to fill the latter about the opposed end portions of such reinforcing bars.

2. Apparatus for butt splicing upper and lower metal reinforcing bars in a reinforced concrete column construction comprising a removable clamping support on the lower bar, means on said clamping support to align and separably support the lower end of a strong non-removable sleeve mold adapted to become an integral part of the final splice enclosing the opposed ends of such upper and lower bars to be spliced and providing an annular mold chamber defining space around the ends of the bars, means on the upper bar to align the upper end of said mold with such upper bar, a central aperture in said mold, an insert guide tube fitted in and projecting laterally from said aperture, a pouring basin, and means to separably support said pouring basin on said guide tube in closely fitting relationship thereover for introduction of molten metal into said sleeve mold substantially to fill the same about the opposed ends of such bars.

3. Apparatus as set forth in claim 2 wherein said pouring basin has a horizontal passageway communicating with said guide tube, an elbow bend connected to said horizontal passageway and a vertical passageway, and a crucible on the top of said pouring basin communicating with said vertical passageway.

4. Apparatus as set forth in claim 3 wherein said pouring basin is externally adjustably supported.

5. Apparatus as set forth in claim 4 wherein said pouring basin and crucible comprise mating graphite blocks.

6. Apparatus as set forth in claim 2 wherein said sleeve mold is provided with internal square cut grooves whereby such molten metal will mechanically interlock said mold and bars.

7. Apparatus as set forth in claim 2 including means to seal at least the lower end of said sleeve to the lower bar.

8. Apparatus as set forth in claim 2 wherein said support means for said pouring basin comprises a chain clamp extending about said sleeve.

9. Apparatus as set forth in claim 2 wherein said support means comprises an adjustable screw engaging the bottom of said pouring basin.

10. Apparatus for butt splicing slightly spaced upper and lower metal reinforcing bars in a reinforced concrete column construction comprising a clamping support removably mounted on the lower bar, adjustable means on said clamping support to adjustably align and releasably support the lower end of a strong non-removable sleeve mold adapted to become an integral part of the final splice enclosing the opposed slightly spaced ends of such upper and lower bars to be spliced and providing an annular mold chamber defining space around the ends of the bars, means connectable to the upper bar to align the upper end of said mold with such upper bar, a generally central aperture in said mold, means to support a pouring basin against said mold in fitted communication with said aperture, and means to introduce molten metal into said pouring basin to flow laterally through such aperture to fill said mold about the opposed slightly spaced ends of such upper and lower metal reinforcing bars.

References Cited by the Examiner

UNITED STATES PATENTS

| | | | |
|---|---|---|---|
| 558,271 | 4/1896 | Falk | 22—206 |
| 1,389,785 | 5/1920 | Riblet. | |
| 1,793,047 | 2/1931 | Brewitt. | |
| 2,313,074 | 3/1943 | Jewell. | |
| 2,360,758 | 10/1944 | Cadwell. | |
| 2,932,863 | 4/1960 | Ahlert. | |
| 3,004,310 | 10/1961 | Burke. | |
| 3,022,554 | 2/1962 | Burke. | |
| 3,113,359 | 12/1963 | Burke. | |

FOREIGN PATENTS 842,095 7/1960 Great Britain.

J. SPENCER OVERHOLSER, *Primary Examiner.*

DAVID L. RECK, WILLIAM J. STEPHENSON, MICHAEL V. BRINDISI, *Examiners.*

V. K. RISING, *Assistant Examiner.*